(12) United States Patent
Wolking et al.

(10) Patent No.: US 11,306,625 B2
(45) Date of Patent: Apr. 19, 2022

(54) VALVE ROTATING DEVICE

(71) Applicant: FEDERAL-MOGUL VALVETRAIN GMBH, Barsinghausen (DE)

(72) Inventors: Antonius Wolking, Barsinghausen (DE); Luthfi Arief, Hannover (DE); Florian Ringeling, Hannover (DE)

(73) Assignee: Federal-Mogul Valvetrain GmbH, Barsinghausen (DE)

( * ) Notice: Subject to any disclaimer, the term of this patent is extended or adjusted under 35 U.S.C. 154(b) by 163 days.

(21) Appl. No.: 16/763,726

(22) PCT Filed: Jul. 5, 2018

(86) PCT No.: PCT/EP2018/068215
§ 371 (c)(1),
(2) Date: May 13, 2020

(87) PCT Pub. No.: WO2019/091605
PCT Pub. Date: May 16, 2019

(65) Prior Publication Data
US 2020/0347755 A1    Nov. 5, 2020

(30) Foreign Application Priority Data
Nov. 13, 2017   (DE) .................... 10 2017 126 541.4

(51) Int. Cl.
*F01L 1/32* (2006.01)
*F01L 1/46* (2006.01)
(Continued)

(52) U.S. Cl.
CPC ...... *F01L 1/32* (2013.01); *F01L 1/46* (2013.01); *F16K 29/00* (2013.01); *F16K 29/02* (2013.01)

(58) Field of Classification Search
CPC ................. F01L 1/32; F01L 1/46; F16K 29/00
(Continued)

(56) References Cited

U.S. PATENT DOCUMENTS 2,624,323 A * 1/1953 Thorne .................. F01L 1/32
123/90.3
3,710,768 A * 1/1973 May ...................... F01L 1/32
123/90.3
(Continued)

FOREIGN PATENT DOCUMENTS

FR      2159794 A5      6/1973
GB      2040399 A  *    8/1980 ............. F16K 29/00
(Continued)

OTHER PUBLICATIONS

International Search Report dated Aug. 31, 2018 (PCT/EP2018/068215).

*Primary Examiner* — Jorge L Leon, Jr.
(74) *Attorney, Agent, or Firm* — Robert L. Stearns; Dickinson Wright, PLLC

(57) ABSTRACT

A valve rotating device has an annular main body, an annular cover body, and an annular axial spring element. The main body has multiple pockets of variable depth so that raceways are formed for balls situated therein, wherein tangential springs press the balls against ends of the pockets in the circumferential direction. The cover body is rotatable relative to the main body about an axis and is axially displaceable, and has an annular first support element, an annular second support element, and a connection, wherein the support elements are axially spaced apart from one another and the connection connects the support elements so that they are fixed relative to one another. The axial spring element at a first end rests on an annular stop surface of the main body, and at a second end rests on a surface of the first support element, wherein the axial spring element is situated between the first support element and the second support element. A surface of the second support element facing away from the axial spring element rests against the balls, (Continued)

and the balls and the axial spring element are arranged in an overlapping manner in the axial direction.

11 Claims, 2 Drawing Sheets

(51) Int. Cl.
*F16K 29/02* (2006.01)
*F16K 29/00* (2006.01)

(58) Field of Classification Search
USPC .............................................. 123/90.28, 90.3
See application file for complete search history.

(56) References Cited

U.S. PATENT DOCUMENTS

| | | | | | |
|---|---|---|---|---|---|
| 3,890,943 | A | * | 6/1975 | Schonlau | F01L 1/32 123/90.3 |
| 4,075,987 | A | * | 2/1978 | Tauschek | F01L 1/32 123/90.28 |
| 4,141,325 | A | * | 2/1979 | Shalaty | F01L 1/32 123/90.3 |
| 4,154,424 | A | * | 5/1979 | Cherrie | F01L 1/32 123/90.3 |
| 4,538,558 | A | * | 9/1985 | Updike | F01L 3/10 123/90.3 |
| 2003/0037742 | A1 | * | 2/2003 | Engesser | F01L 1/32 123/90.31 |

FOREIGN PATENT DOCUMENTS

| | | | |
|---|---|---|---|
| GB | 2040399 | A | 8/1980 |
| JP | H11324620 | A | 11/1999 |

\* cited by examiner

VALVE ROTATING DEVICE

BACKGROUND

1. Technical Field

The present invention relates to a valve rotating device for internal combustion engines.

2. Related Art

The valves of an internal combustion engine must continuously rotate during operation in order to prevent non-uniform load on the valves in the circumferential direction. One-sided wear and deposits on the valve seat are avoided due to the rotation. In addition, a uniform temperature distribution is achieved in the circumferential direction. If the "natural" rotation of the valves is too slight, forced rotation devices, so-called valve rotating devices, are used.

Valve rotating devices generate valve rotation in that balls that are situated in pockets in a base body and that rest against a disk spring are forced to roll on inclined raceways formed in the pockets, thus rotating the base body and the disk spring relative to one another about the valve axis. A cover which at the same time supports the valve spring is connected to the disk spring by frictional locking. The rotation may take place either during the valve opening stroke or during the valve closing stroke. Top-mounted designs, i.e., with the valve rotating device situated on the side of the valve spring facing away from the combustion chamber, as well as bottom-mounted designs, i.e., with the valve rotating device situated on the side of the valve spring facing the combustion chamber, are possible. In the top-mounted design, the base body has a conical opening into which conical sections are inserted that hold the valve on the stem end. In the bottom-mounted design, the base body rests on the cylinder head, and the rotation is transmitted to the valve via the valve spring.

Due to the contact of the balls with the disk spring at specific points, high rolling pressures occur which result in a high load on the disk spring. The high rolling load results in wear on the disk spring, in particular pitting (i.e., pitting corrosion or point corrosion).

Examples of valve rotating devices from the prior art are disclosed in the patent documents JPH 11324620 A, FR2159794A5, GB2040399A, and U.S. Pat. No. 3,710,768A.

SUMMARY

A compact valve rotating device is provided that avoids high rolling loads and the accompanying wear on the disk spring.

The valve rotating device according to an embodiment comprises an annular base body having multiple pockets, oriented in a circumferential direction, in which a ball and a tangential spring are situated in each case, wherein the pockets have a variable depth in the circumferential direction so that inclined raceways for the balls situated therein are formed, wherein the tangential springs press the balls in the direction of one end of the particular pocket. An annular cover body is included that is rotatable relative to the base body about an axis and axially displaceable. An annular first support element and an annular second support element are also provided that are axially spaced apart from one another, and a connection that connects the first and the second support element and fixes the first and the second support element relative to one another is also provided. Further included is an annular axial spring element, wherein a first end of the axial spring element is supported on an annular stop surface of the base body, and a second end of the axial spring element is supported on a surface of the first support element, wherein the axial spring element is situated between the first support element and the second support element. A surface of the second support element facing away from the axial spring element rests against the balls, and wherein the balls and the axial spring element are arranged in an overlapping manner in the radial axial direction.

According to a further aspect, the connection is situated radially outside the axial spring element.

According to a further aspect, the stop surface is provided with an anti-friction coating.

According to a further aspect, an axial needle bearing or an axial ball bearing is situated on the stop surface.

According to a further aspect, the axial spring element is a disk spring.

According to a further aspect, the axial spring element includes at least two stacked disk springs.

According to a further aspect, the first support element, the second support element, and the connection means are manufactured in one piece.

According to a further aspect, the connection means is present in the form of an annular outer wall having a recess that allows the axial spring element to be laterally inserted.

According to a further aspect, at least one of the first and the second support elements has an annular extension that extends in the axial direction and forms the connection means, wherein a free end of the at least one extension has engagement elements that are brought into engagement with complementary engagement elements on the other support element.

According to a further aspect, the connection means includes multiple connection means that are situated around the axial spring element after the axial spring element is inserted.

According to a further aspect, a surface of the first support element facing away from the axial spring element is configured for use as a support surface for a valve spring.

According to a further aspect, the surface of the second support element facing away from the axial spring element has a ball raceway.

The term "axial" refers to an axis which is defined by the annular bodies, and which in the installed state coincides with the valve axis.

BRIEF DESCRIPTION OF THE DRAWINGS

Exemplary embodiments of the invention are described in greater detail below with reference to the figures, which show the following.

DETAILED DESCRIPTION

Figure 1:
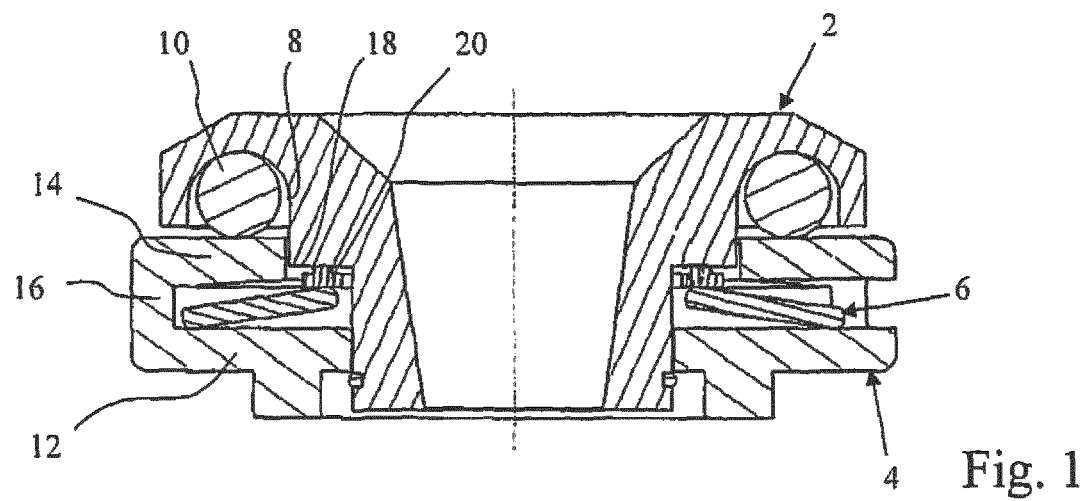
FIG. 1 shows an axial section of a valve rotating device according to one embodiment of the invention.

FIG. 1 illustrates a valve rotating device according to an embodiment shown in an axial section; i.e., an axis of the valve rotating device is situated in the section plane. The valve rotating device includes an annular base body 2, an annular cover body 4, and an annular axial spring element 6. The base body 2 and the cover body 4 are rotatable relative to one another about the axis of the valve rotating device (i.e., in the circumferential direction) and displaceable relative to one another in the axial direction. A top-mounted design is illustrated. Accordingly, the base body 2 is provided with a conical opening in which conical sections that are suitable for holding a valve may be inserted. A bottom-mounted design is likewise possible. In that case it is not necessary to have a conical opening, but instead, only an opening through which the stem of a valve may extend.

Multiple pockets 8 (or depressions) that are oriented in the circumferential direction and that in each case extend in the circumferential direction (perpendicular to the plane of the drawing) over a certain angular range are incorporated into the base body 2 in the circumferential direction. The depth of the pockets 8 (i.e., the extension of the pockets in the axial direction) is variable in the circumferential direction, so that an inclined raceway 26 is formed in each of the pockets 8; see FIG. 5. A ball 10 and a tangential spring 28 (not illustrated) are situated in each of the pockets 8, wherein the balls are able to roll on the inclined raceway 26. The diameter of the balls 10 should be greater than a shallowest depth of the pockets 8. It is preferred that all balls have the same diameter, and all pockets have the same dimensions. The tangential springs 28 press the balls 10 in the circumferential direction against a respective end of the pockets 8, in particular against the end at which the pocket in question has its shallowest depth.

In addition, the base body 2 has a stop surface 18 on which a first end of the axial spring element 6 is supported, the stop surface 18 preferably being situated farther radially inwardly (i.e., in a direction perpendicular to the axis) than the pockets 8. Situated on the stop surface 18 is an axial needle bearing 20 that allows low-friction rotation of the base body 2 and the axial spring element 6 relative to one another about the axis.

The cover body 4 has an annular first support element 12, an annular second support element 14, and a connection means, or connection 16 that connects the first and the second support element. The first support element 12 and the second support element 14 are axially spaced apart from one another, wherein the connection means 16 supports the two support elements 12, 14 in the axial direction so that a distance between the first and the second support element is constant. At the same time, the connection means 16 prevents relative rotation of the two support elements 12, 14 relative to one another (about the axis). The connection means 16 thus fixes the relative position of the first and second support elements in the axial and/or circumferential direction.

The axial spring element 6 is situated between the first support element 12 and the second support element 14 in the axial direction, wherein a second end of the axial spring element 6 is supported on a surface of the first support element 12. The axial spring element 6 is situated farther inwardly in the radial direction than the connection means 16. The axial spring element 6 brings about an elastic force in the axial direction that pushes the base body 2 and the cover body 4 apart if necessary, since the first end of the axial spring element 6 is supported on the stop surface 18 of the base body 2. The axial spring element 6 and the balls 10 are arranged in an overlapping manner in the axial direction. The axial spring element 6 and the balls 10 are adjacently situated in the axial direction, with the second support element 14 situated between the axial spring element 6 and the balls 10. The overall sequence in the axial direction is preferably as follows: first support element 12, axial spring element 6, second support element 14, and balls 10; i.e., these four parts overlap in the axial direction. A disk spring is preferably used as the axial spring element 6.

A surface of the second support element 14 facing away from the axial spring element 6 rests against the balls 10, which are situated in the pockets 8 of the base body 2. When the base body 2 and the cover body 4 are pressed together against the force of the axial spring element 6, for example during the opening stroke of the valve, an axial force is exerted on the balls 10, which then roll on the one hand on the inclined raceways 26 in the pockets 8, and on the other hand on the surface of the second support element 14 facing away from the axial spring element. The base body 2 and the cover body 4 are thus rotated relative to one another about the axis. When load on the valve rotating device is relieved, for example during the closing stroke of the valve, the axial spring element 6 once again pushes the base body 2 and the cover body 4 apart, wherein the force acting on the balls 10 becomes smaller and therefore no rolling of the balls takes place when they are reset by the tangential springs 28.

The rolling of the balls, in contrast to known valve rotating devices, takes place on the second support element, not on the disk spring. High rolling pressure and the accompanying wear on the disk spring are thus avoided. The second support element in turn may have a simpler design that corresponds to the rolling loads that occur, since it does not have to take on a spring function at the same time. In addition, the selection of the axial spring element, in particular a disk spring, is not limited by the rolling load, which allows more freedom in the design of the axial spring element. This allows a compact, space-saving design of the valve rotating device. Since the disk spring is completely inserted into the cover body, the entire stroke movement of the disk spring is converted into a rotational movement via the inclination of the pockets. The rotational movement per stroke may thus be increased approximately 1.5- to 2-fold compared to previous designs. Alternatively, with the rotation unchanged, a stiffer disk spring having an extended service life may be used.

The surface of the second support element 14 facing away from the axial spring element 6 may have a ball raceway, thus reducing the rolling pressure on the second support element, for example.

The surface of the first support element 12 facing away from the axial spring element 6 is preferably configured for use as a support surface for a valve spring.

Figure 4:
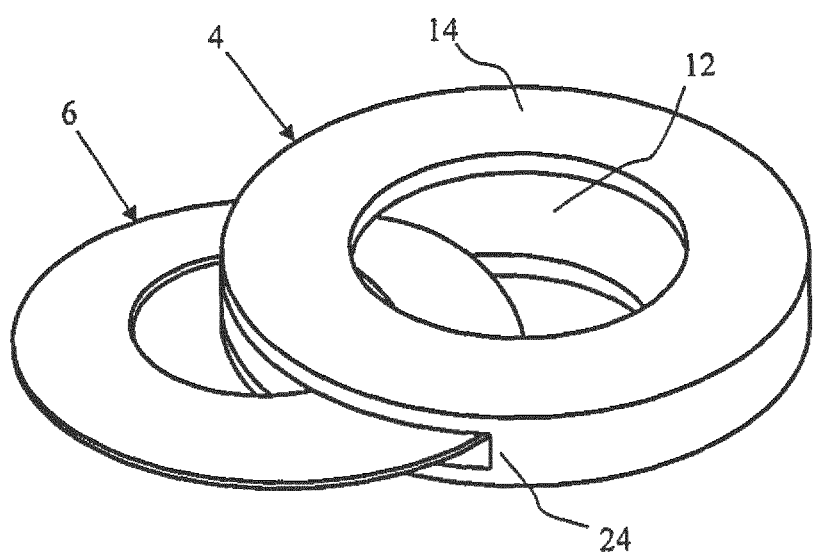
FIG. 4 shows a perspective view of a cover body with a partially inserted axial spring element.

The first support element 12, the second support element 14, and the connection means 16 are preferably manufactured in one piece. In FIG. 1 the connection means 16 by way of example is implemented as an annular wall having a recess that allows (in particular is large enough for) lateral insertion of the axial spring element 6. The recess is discernible on the right side in the sectional view. FIG. 4 illustrates a corresponding detailed view in which the axial spring element 6 is shown in a partially inserted state. In this case, the annular wall having a recess, denoted by reference numeral 24, is manufactured in one piece with the first support element 12 and the second support element 14.

Other designs of the connection means, not illustrated, are also conceivable. For example, the connection means may include multiple connecting elements that are annularly situated around the axial spring element, thus forming a cage, the connecting elements being mounted only after the axial spring element is arranged between the first and the second support element. For example, pins or partial ring sections extending in the circumferential direction may be used as connecting elements.

In another conceivable design of the connection means, the connection means is present in the form of at least one annular extension that extends in the axial direction of one of the support elements. A free end of the at least one extension may be provided with engagement elements, which may be brought into engagement with engagement elements that are provided on the other support element or optionally on an annular extension of the other support element, in order to fix the two support elements relative to one another in the circumferential and axial directions. In the axial direction, the two support elements on the one hand are supported on one another, and on the other hand are pressed together by the valve spring in the installed state.

Figure 2:
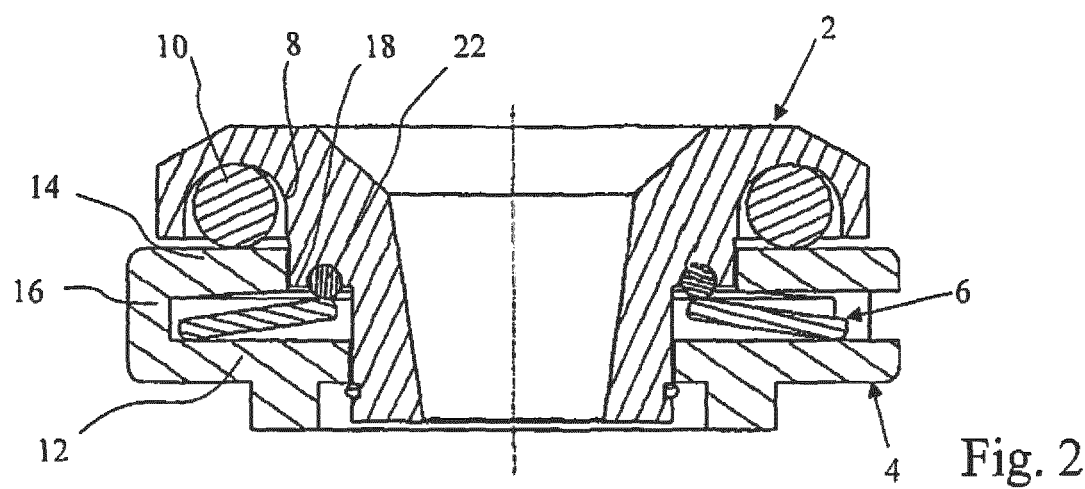
FIG. 2 shows an axial section of a valve rotating device according to another embodiment.

The embodiment illustrated in FIG. 2 is essentially identical to the one shown in FIG. 1. The only difference is that an axial ball bearing 22 that allows a low-friction relative rotational movement of the base body and the axial spring element or the cover body about the axis is situated on the stop surface 18. Otherwise, the above discussion for FIG. 1 applies to FIG. 2. Of course, axial bearings other than those shown in FIGS. 1 and 2 may be used, for example an axial cylindrical roller bearing or an axial conical roller bearing.

Figure 3:
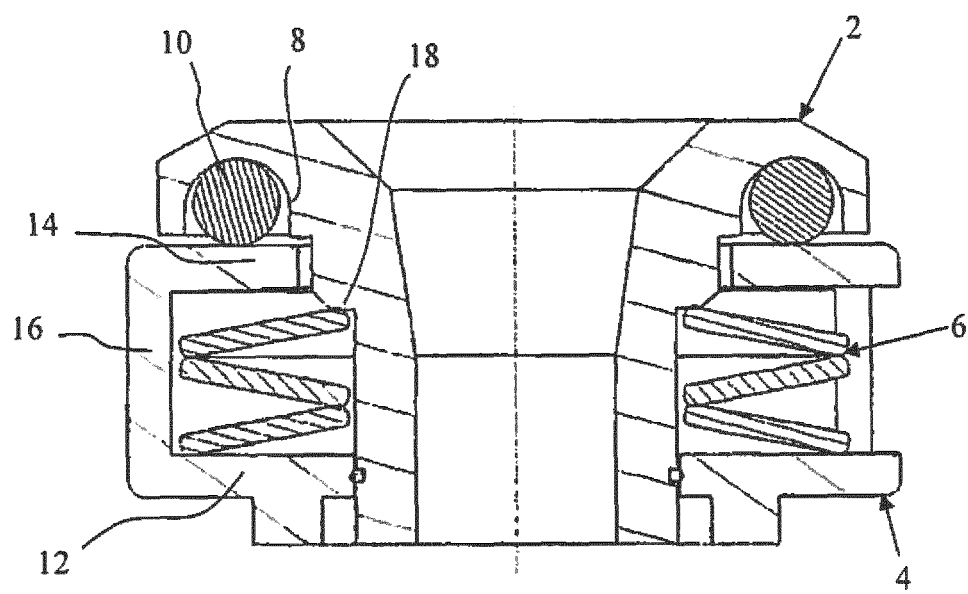
FIG. 3 shows an axial section of a valve rotating device according to another embodiment.

FIG. 3 illustrates another embodiment. This embodiment is essentially identical to the embodiments shown in FIGS. 1 and 2 except for two differences. First, in this case the stop surface 18 of the base body 2 is provided with a friction-reducing anti-friction coating, so that the first end of the axial spring element 6 may slide on the stop surface 18 with low friction. Second, the axial spring element 6 includes multiple stacked disk springs, with appropriate adaptation of the distance between the two support elements 12, 14.

Figure 5:
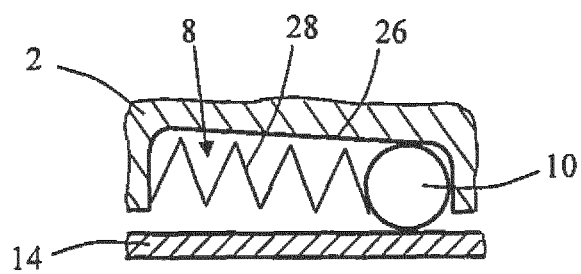
FIG. 5 shows a section in the circumferential direction of a pocket.

FIG. 5 illustrates a partial sectional view in the circumferential direction, showing a pocket 8 with an inclined raceway 26. Situated in the pocket 8 is a ball 10, and a tangential spring 28 that presses the ball 10 against the end of the pocket 8 at the shallowest depth of the pocket. Also shown is a section of the second support element 14 that rests against the ball 10. When there is axial load, the base body 2 and the second support element 14 are moved toward one another, so that the ball 10 rolls on the inclined raceway 26 and also on the surface of the second support element 14, thus rotating the base body 2 relative to the cover body about the axis.

The invention claimed is:

1. A valve rotating device comprising
an annular base body including a plurality of pockets formed as inclined raceways and arrayed circumferentially, each pocket including a tangential spring biasing a ball towards a first end of the pocket;
an annular cover body configured to be displaced axially and rotationally relative to the base body the cover body including an annular first support element fixed to an annular second support element via a connection so as to be axially spaced apart from one another; and
an annular axial spring element arranged between the first support element and the second support element, the axial spring element including a first end supported on an annular stop surface of the base body, and a second end supported on a first axial surface of the first support element,
wherein a first axial surface of the second support element facing away from the axial spring element rests against the balls such that the balls and the axial spring element are arranged in an axially overlapping manner,
wherein the first support element, the second support element, and the connection are manufactured in one piece, and
wherein the connection is an annular outer wall including a recess through which the axial spring element is laterally inserted.

2. The valve rotating device according to claim 1, wherein the connection is situated radially outside the axial spring element.

3. The valve rotating device according to claim 1, wherein the stop surface is provided with an anti-friction coating.

4. The valve rotating device according to claim 1, wherein the stop surface includes an axial needle bearing or an axial ball bearing.

5. The valve rotating device according to claim 1, wherein the axial spring element is a disk spring.

6. The valve rotating device according to claim 1, wherein the axial spring element includes at least two stacked disk springs.

7. The valve rotating device according to claim 1, wherein a second axial surface of the first support element facing away from the axial spring element is configured as a support surface for a valve spring.

8. The valve rotating device according to claim 1, wherein the first axial surface of the second support element has a ball raceway.

9. A valve rotating device, comprising:
an annular base body including a plurality of pockets arrayed circumferentially each pocket formed as an inclined raceway;
a plurality of balls respectively arranged in the plurality of pockets such that each ball is urged toward a first end of a corresponding pocket of the plurality of pockets via a tangential spring;
an annular cover body configured to be displaced axially and rotationally relative to the base body, the cover body including an annular first support element and an annular second support element that are axially spaced apart from one another, the first and second support elements fixed to one another via a connection; and
an annular axial spring element disposed between the first and second support elements, the axial spring element including a first end supported on an annular stop surface of the base body, and a second end supported on a first axial surface of the first support element,
wherein a first axial surface of the second support element facing away from the axial spring element rests against the plurality of balls such that the plurality of balls and the axial spring element axially overlap; and
wherein the connection includes a recess through which the axial spring element is laterally inserted.

10. The valve rotating device according to claim 9, wherein the connection includes an annular extension extending axially from at least one of the first and second support elements.

11. The valve rotating device according to claim 9, wherein the connection includes a plurality of connections arranged around the axial spring element after the axial spring element is inserted.

* * * * *